D. N. SANTMIER.
TREE TRANSPLANTER.
APPLICATION FILED JULY 7, 1906.
903,787.
Patented Nov. 10, 1908.
Fig. 1.
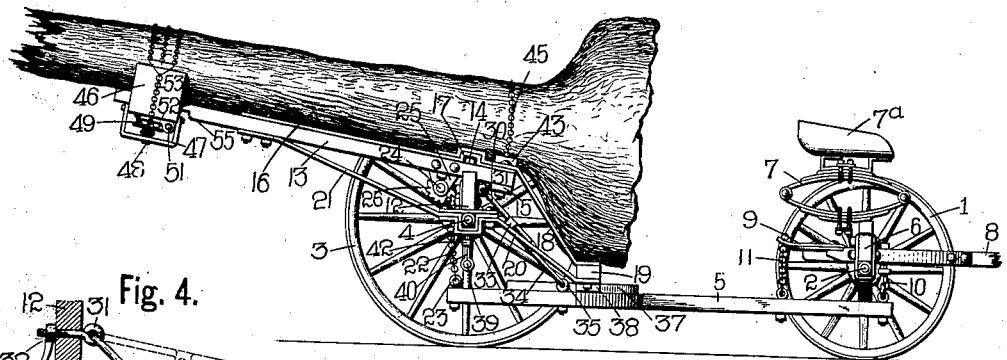
Fig. 4.
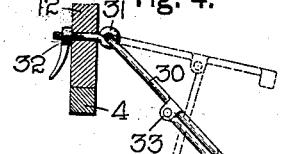
Fig. 5.
Fig. 6.
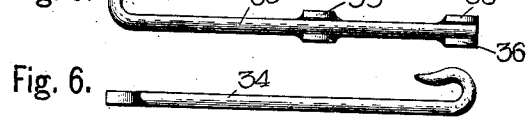
Fig. 11.
Fig. 2.
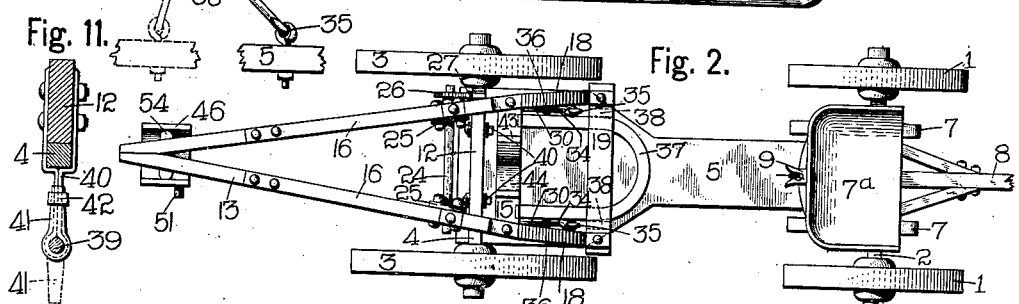
Fig. 7.
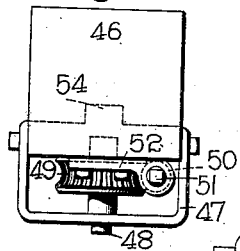
Fig. 8.
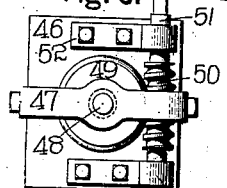
Fig. 3.
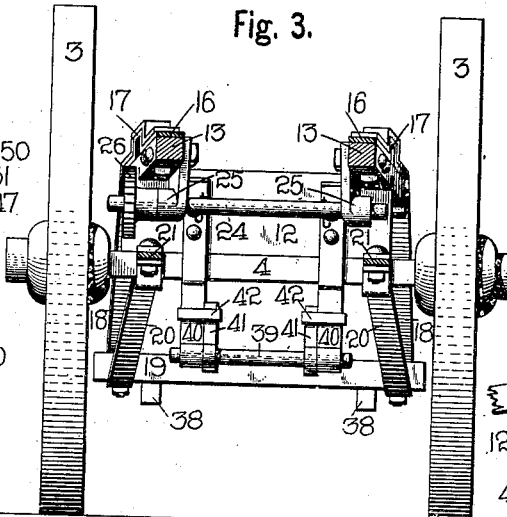
Fig. 9.
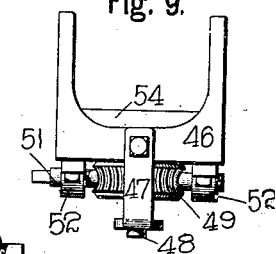
Fig. 10.
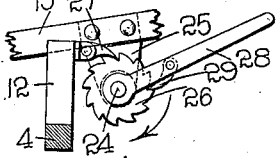
Witnesses.
L. M. Sangster.
Geo. A. Neubauer.
Inventor.
David N. Santmier
By C. J. Sangster
Attorney.

UNITED STATES PATENT OFFICE.

DAVID N. SANTMIER, OF BUFFALO, NEW YORK.

TREE-TRANSPLANTER.

No. 903,787.  Specification of Letters Patent.  Patented Nov. 10, 1908.

Application filed July 7, 1906. Serial No. 325,084.

*To all whom it may concern:*

Be it known that I, DAVID N. SANTMIER, a citizen of the United States, residing at Buffalo, in the county of Erie and State of New York, have invented a certain new and useful Improvement in Tree-Transplanters, of which the following is a specification.

This invention relates to an improved apparatus for transplanting trees, and the object of the invention is to produce an apparatus by the use of which the labor incident to the removing, transporting and replanting of large and heavy trees will be minimized.

The invention also relates to certain details of construction, all of which will be fully and clearly hereinafter described and claimed, reference being had to the accompanying drawings, in which,—

Figure 1, shows a side elevation of the improved tree transplanting apparatus, with a tree supported thereon ready for transportation, one wheel being removed from each truck so as to fully disclose the construction. Fig. 2, is a top plan view of the improved apparatus. Fig. 3, is an enlarged detached rear elevation of the rear truck, a transverse section being cut through the V-shaped frame. Fig. 4, is an enlarged detached side view of one of the two-part rods for connecting the rear truck to the platform, a section being cut through the rear axle and bed piece and a fragment of the platform being shown; the rod being shown in its normal position in full lines, and "broken" or partially folded in dotted lines. Figs. 5 and 6, are enlarged detached views of the members of the two-part rod. Fig. 7, is an enlarged side elevation of the device at the rear end of the V-shaped frame for securing the tree in place on the frame. Fig. 8, is a bottom plan view of the same. Fig. 9, is an end elevation of the same. Fig. 10, is an enlarged fragmentary view of the rear truck, showing the ratchet device for winding up the chains which support the rear end of the platform. Fig. 11, is an enlarged detached transverse section through the rear axle and bed piece, showing the device for limiting the upward movement of the rear end of the platform.

In referring to the drawings for the details of construction like numerals designate like parts.

1, represents the front wheels; 2, the front axle; 3, the rear wheels; 4, the rear axle; and 5, the platform or "boat" which connects the front and rear trucks, see Fig. 1. A bed piece 6, is secured to the top of the front axle in the usual way, said bed piece supporting springs 7, upon which is secured a driver's seat 7ª, see Figs. 1 and 2. The pole 8, is secured to the axle 2, and bed piece 6, in the well known way and extends rearwardly past said axle and bed piece, terminating in an iron bar 9, which is forked at its rear end.

The front end of the platform is connected to the front truck by a connection 10, see Fig. 1, and a chain 11, having its lower end secured to an eye bolt in the platform 5, has its upper end held in the catch or fork of the bar 9.

A bed piece 12, is fastened to the rear axle 4, in the well known way and a V-shaped frame 13, is secured to the top of the bed piece by bolts 14, see Fig. 1, where the head of one of the bolts is shown. The greater portion of the V-shaped frame 13, extends rearwardly from the bed piece and at a slight oblique upward angle, the rear ends of the frame members being secured together by bolts. At the front or wide end of the V-shaped frame, is a horizontal cross bar 15, securely bolted thereto. A metal strengthening bar or strip 16, is securely bolted to the top surface of each member of the V-shaped frame, being bent near its front end as shown at 17, in Fig. 1, to form a pocket so as to clear the bolt 14. Two obliquely extending metal brace bars 18, have their upper ends secured to the cross bar 15, and the front ends of the members of the V-shaped frame 13, by bolts, and incline obliquely downward and forward and have their lower ends fastened to the ends of a horizontal cross bar 19. Directly below these two brace bars are two other brace bars 20, secured at their lower front ends to the bottom surface of the cross bar 19, and at their upper ends to the axle 4. Two additional brace bars 21, extend obliquely rearward from this point and are secured at their rear ends to the bottom surface of the V-shaped frame 13, see Fig. 1. The brace bars 18, 20 and 21, are secured in the usual way by bolts.

The rear end of the platform or boat 5, is supported from the rear truck by chains which can be lengthened or shortened to lower or raise the platform and so properly balance the tree. These chains 22, have their lower ends secured to eye-bolts 23, at the rear end of the platform 5, and their upper ends hooked onto a transverse shaft 24, mounted in bearings 25, depending from the V-shaped frame.

One end of the shaft projects beyond its bearing and has a ratchet wheel 26, mounted thereon, said ratchet wheel being engaged by a pawl 27, pivoted to the bed piece 12, which prevents the rotation of the shaft in one direction.

The shaft is rotated to wind up the chain 22, by means of a ratchet wrench 28, which fits on the projecting end of the shaft and carries a pawl 29, adapted to engage with the teeth of the ratchet 26. A downward movement of the wrench rotates the shaft in the direction indicated by the arrow in Fig. 10, while the pawl 27, holds the shaft stationary as the wrench is returned for another stroke. When it is desired to unwind the chains, the pawl 27, is lifted out of engagement with the ratchet wheel, thereby permitting the weight of the platform to unwind the chains.

The platform 5, is additionally secured to the rear truck by two connecting links which are made in two parts pivoted together. These connecting links are duplicates and are located on opposite sides of the platform and extend parallel to each other. The upper member 30, of each link, has its upper extremity bent to form a hook which hooks into an eye-bolt 31, carried by the bed piece 12. This eye-bolt is secured to the bed piece by a hand nut 32. At an intermediate point of the member 30, are two depending lugs 33, between which is pivoted the upper end of the lower member 34. The lower end of the lower member 34, is bent to form a hook and hooks into an eye-bolt 35, on the platform 5. The front end of the member 30, has two depending ears or lugs 36, forming a fork which straddles the lower member and stiffens the link by preventing any side play.

The rear portion of the platform or "boat" 5, is considerably wider than the forward portion and carries a heavy U-shaped bar 37, on its top surface.

Metal cleats or straps 38, are secured to the bottom surface of the horizontal cross bar 19, so as to fit on each side of the U-shaped bar 37, and while permitting a slight lateral movement or play, prevent any swaying of the rear truck sufficient to upset or laterally over balance the tree on the truck, see Figs. 1, 2 and 3 where these cleats are shown.

A device is provided which limits the upward movement of and firmly supports the rear portion of the platform when desired, as when transplanting comparatively light trees, to properly balance the same.

A horizontal rod 39, is supported beneath the rear axle 2, by metal straps 40, and said rod carries two arms 41, adapted to swing thereon.

When not in use the arms are swung upwardly and held by metal loops 42, carried by the straps 40, as shown in Figs. 1, 3 and 11.

When it is desired to limit the upward movement of the platform 5, the loops 42, are lifted to release the arms 41, which drop into the positions shown in dotted lines in Fig. 11, and contact with the top surface of the platform.

The tree is secured to the V-shaped frame by chains, the horizontal cross bar 15, at the front of the V-shaped frame, carrying a block 43, having a V-shaped depression or recess 44, in which the trunk of the tree fits, the butt of the tree being secured in the well known way by a chain 45.

A device is attached to the rear end or apex of the V-shaped frame to securely fasten the tree thereto; said device consisting of a U-shaped yoke 46, which straddles the V-shaped member and a portion of the tree trunk, and is held in place by chains. A bracket 47, depends from the yoke 46, and supports a vertical shaft 48, carrying a worm wheel 49, which meshes with a worm 50. The worm 50, is carried by a horizontal shaft 51, journaled in bearings 52, secured to the bottom of the yoke 46, one end of the shaft projecting beyond the yoke and having a square end upon which a crank may be placed to rotate said shaft. A chain 53, is secured at one end to the yoke 46, and passes over the tree trunk and then winds around the vertical shaft 48, the shaft being rotated by the worm 50, and worm wheel 49.

If desired the chain 53, may be broken and a portion consisting of three parallel chains inserted in the middle thereof so that the three chains pass over the top of the tree trunk as shown in Fig. 1.

The yoke 46, is provided with a cleat 54, upon the interior of its horizontal portion which is adapted to seat in notches 55, in the bottom surface of the V-shaped frame member. A plurality of these notches are provided so that the position of the yoke may be changed to avoid low growing branches on the tree.

The operation of this apparatus is as follows,—The rear truck or lifting portion being detached from the remainder of the wagon, is moved up to the tree it is desired to transplant, an opening first having been made in the ground around the roots of the tree. The ground on both sides of the tree is left as nearly level as possible so that the wheels 2, will not sink into the opening in the ground which is made so as to permit the bar 19, to dip into it and contact with the root or ball of the tree. The truck is tilted upward so that the V-shaped frame is in close proximity to the tree trunk, and the cross bar 19, in contact with the roots of the tree. The tree is now secured to the V-shaped frame by the chains 45 and 53, as before described, when the truck is turned down into the position shown in Fig. 1. The platform or "boat" 5, is now placed beneath the rear truck, and the upper ends of the chains 22, hooked onto the shaft 24. The upper ends of the two-part links are now hooked into the eye-bolts 31, on the bed piece 12, and their lower ends hooked into the eye-bolts 35, on the platform 5. The front truck is now backed up to the front end of the platform 5, and the pole 8, tilted up so as to lower the rear end thereof. The chain 11, is now hooked into the forked rear end of the bar 9, and the pole 8, lowered which lifts the platform from the ground and permits the connection 10, to be interlocked, thereby securing the platform to the front truck. The ratchet wrench 28, is now placed upon the end of the shaft 24, and operated as before described to rotate the shaft and wind up the chains 22 until the platform is lifted to such height as to properly balance the tree.

By referring to Fig. 1, it will be seen that the ball or root of the tree rests upon the cross bar 19, which in turn is supported by the platform. By raising the platform the ball or root of the tree is correspondingly raised which throws the weight of the tree rearwardly. By lowering the platform the ball or root of the tree is also lowered which throws the weight of the tree forward. It will thus be seen that by adjusting the height of the platform, the tree can be accurately balanced upon the wagon. Horses are now hitched to the pole of the wagon and the tree is drawn to the place of replanting where the operation is practically reversed.

I claim as my invention—

1. In an apparatus of the class described, a front truck, a rear truck, a platform connecting the front and rear trucks and a V-shaped frame extending rearwardly from the platform supported from both the platform and the rear truck and adapted to support the body of the tree, a cross bar adapted to contact with and support the root of the tree, inclined bars extending obliquely downward and forward from the V-shaped frame to the lower forward extremities of which the cross bar is attached and connecting links consisting of pivotally connected members for additionally securing the platform to the rear truck, substantially as set forth.

2. In an apparatus of the class described, a front truck, a rear truck, a platform, means connecting the front truck to the platform, a V-shaped frame extending rearwardly from the platform supported from both the platform and the rear truck and adapted to support the body of the tree, a shaft mounted in bearings depending from the V-shaped frame, chains attached to the shaft and rear end of the platform and means for winding the chains on said shaft and thereby varying the vertical position of the rear of the platform to properly balance a tree supported on the apparatus, substantially as set forth.

3. In an apparatus of the class described, a front truck, a rear truck, a platform connecting the front and rear trucks, a tree supporting frame, and links comprising pivotally connected members for additionally securing the platform to the rear truck.

DAVID N. SANTMIER.

Witnesses:
L. M. SANGSTER,
GEO. A. NEUBAUER.